US011865953B2

(12) United States Patent
Zhang et al.

(10) Patent No.: US 11,865,953 B2
(45) Date of Patent: Jan. 9, 2024

(54) CHILD SAFETY SEAT AND SIDE IMPACT PROTECTION MECHANISM THEREOF

(71) Applicant: BAMBINO PREZIOSO SWITZERLAND AG, Steinhausen (CH)

(72) Inventors: Daliang Zhang, Dongguan (CN); Hongbo Chen, Dongguan (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/513,215

(22) Filed: Oct. 28, 2021

(65) Prior Publication Data
US 2022/0126732 A1  Apr. 28, 2022

(30) Foreign Application Priority Data
Oct. 28, 2020 (CN) .......................... 202011176299.8

(51) Int. Cl.
*B60N 2/28* (2006.01)
*B60N 2/90* (2018.01)

(52) U.S. Cl.
CPC ........... *B60N 2/2872* (2013.01); *B60N 2/286* (2013.01); *B60N 2/2821* (2013.01);
(Continued)

(58) Field of Classification Search
CPC .... B60N 2/2872; B60N 2/2884; B60N 2/286; B60N 2/2821; B60N 2/919
See application file for complete search history.

(56) References Cited

U.S. PATENT DOCUMENTS 10,933,779 B2   3/2021 Cui

FOREIGN PATENT DOCUMENTS

| CA | 3077919 A1 * | 10/2020 | ........... B60N 2/2803 |
| CN | 207360132 U | 5/2018 | |

(Continued)

OTHER PUBLICATIONS

DE Office Action dated Jan. 4, 2023; DE Application No. 10-2021212184.5; Applicant Bambino Prezioso Switzerland AG.
(Continued)

*Primary Examiner* — Anthony D Barfield
(74) *Attorney, Agent, or Firm* — Quarles & Brady LLP

(57) ABSTRACT

The present disclosure discloses a child safety seat and a side impact protection mechanism thereof, the side impact protection mechanism is provided at a backrest of the child safety seat and includes a side impact protection block and a self-locking structure. The side impact protection block is movably fitted to the backrest and has a folding position in which the side impact protection block is inwardly folded in the backrest and an unfolding position in which the side impact protection block is outwardly unfolded from the backrest. The self-locking structure automatically moves to a position that blocks the side impact protection block in the unfolding position from switching to the folding position when the side impact protection block is switched from the folding position to the unfolding position, the self-locking structure is fitted to the side impact protection block or the backrest, and the backrest and the side impact protection block shields the self-locking structure to block a release operation of the self-locking structure by an operator, so that the side impact protection block cannot be inwardly folded into the backrest after the first use, thereby effectively preventing the side impact protection block from being
(Continued)

accidentally folded during the side impact to provide a side impact protection effect.

17 Claims, 10 Drawing Sheets

(52) U.S. Cl.
CPC ............ *B60N 2/2884* (2013.01); *B60N 2/919* (2018.02); *B60N 2002/2896* (2013.01); *B60N 2002/952* (2018.02)

(56) References Cited

FOREIGN PATENT DOCUMENTS

| | | | |
|---|---|---|---|
| CN | 110962709 | A | 10/2018 |
| CN | 108790970 | A | 11/2018 |
| CN | 107089172 | B | 6/2019 |
| CN | 110254303 | A | 9/2019 |
| CN | 110254303 | A | 9/2019 |
| CN | 112810509 | A | 11/2019 |
| CN | 209719339 | U | 12/2019 |
| EP | 3666588 | A1 | 6/2020 |
| EP | 3738819 | A1 | 11/2020 |
| KR | 20150031251 | A * | 3/2015 ............... B60N 2/42 |
| TW | I579165 | B | 4/2017 |
| WO | WO-2021-094523 | A1 | 5/2021 |

OTHER PUBLICATIONS

TW Office Action dated Dec. 13, 2022, TW Application No. 11121220180.

TW Office Action dated Dec. 13, 2022, TW Application No. 110140134.

* cited by examiner

CHILD SAFETY SEAT AND SIDE IMPACT PROTECTION MECHANISM THEREOF

RELATED APPLICATION

The present application claims the priority of Chinese Patent Application No. 202011176299.8, filed on Oct. 28, 2020, with the title of "CHILD SAFETY SEAT AND SIDE IMPACT PROTECTION MECHANISM THEREOF", the entire content of which is incorporated herein by reference.

TECHNICAL FIELD

The present disclosure relates to a field of baby products, and more particularly to a child safety seat and a side impact protection mechanism thereof.

BACKGROUND

It is well known that a child safety seat is a baby product specially developed by an enterprise for young children. By using a child safety seat, it can effectively prevent a baby from being injured due to sudden braking or collision of an automobile, thereby ensuring the safety of the baby in the automobile. Thus, the child safety seat is very popular among people, which further increasing a popularity of the child safety seat.

At present, for the child safety seat, side impact protection devices are mounted on side wings of a backrest of the child safety seat, in order to provide the child safety seat with a side impact protection function.

In the existing side impact protection device, a side impact protection block is formed so as to can be unfolded or folded relative to the side wings of the backrest. In addition, the side impact protection block in an unfolding position is locked by a releasable lock block, so as to maintain the side impact protection block in the unfolding position stable relative to the side wings of the backrest to provide protection from side impact.

Although a release operation of the lock block can flexibly unfold the side impact protection block, the side impact protection block in the unfolding position may not provide side impact protection during the side impact due to an accidental operation of the lock block.

Therefore, it is necessary to provide a child safety seat and a side impact protection mechanism thereof in which a side impact protection block cannot be folded relative to the backrest after the side impact protection block is unfolded relative to the backrest and used for the first time, so as to overcome the above-mentioned defects.

SUMMARY

It is an object of the present disclosure to provide a side impact protection mechanism in which a side impact protection block cannot be folded relative to a backrest after the side impact protection block is unfolded relative to the backrest and used for the first time.

It is a further object of the present disclosure to provide a child safety seat in which a side impact protection block cannot be folded relative to the backrest after the side impact protection block is unfolded relative to the backrest and used for the first time.

To achieve the above object, the technical solution of the present disclosure is to provide a side impact protection mechanism provided at the backrest of the child safety seat and including a side impact protection block and a self-locking structure. The side impact protection block is movably fitted to the backrest and having a folding position in which the side impact protection block is inwardly folded in the backrest and an unfolding position in which the side impact protection block is outwardly unfolded from the backrest. The self-locking structure is fitted to the side impact protection block or the backrest, the self-locking structure automatically moves to a position that blocks the side impact protection block in the unfolding position from switching to the folding position when the side impact protection block is switched from the folding position to the unfolding position, and the backrest and the side impact protection block shields the self-locking structure to block a release operation of the self-locking structure by an operator.

In an embodiment, the self-locking structure includes a self-locking member fitted to the backrest or the side impact protection block and being telescopically slidable, and a self-locking reset member providing a reset force for a telescopically slidable movement of the self-locking member, the self-locking reset member has a constant tendency to drive the self-locking member to slide in a extending direction to a position that blocks the side impact protection block in the unfolding position from switching to the folding position.

In an embodiment, the self-locking reset member is an elastic member provided between the self-locking member and a side impact protection block or a backrest on which the self-locking member is located.

In an embodiment, the side impact protection block is pivoted to the backrest.

In an embodiment, an end of the self-locking member positioned in front in the extending direction has an inclined surface inclined with respect to the extending direction of the self-locking member, the inclined surface of the self-locking member is positioned in front of the self-locking member in a pivotally unfolding direction of the side impact protection block, and the self-locking member is in a retracted state in which the elastic member is elastically deformed when the side impact protection block is positioned in the folding position.

In an embodiment, the self-locking member is located on the side impact protection block, and the self-locking member is pushed by the backrest to be in a retracted state in which the elastic member is elastically deformed when the side impact protection block is positioned in the folding position.

In an embodiment, the backrest is correspondingly provided with a lock fitting part that is locked with the self-locking member when the side impact protection block is in the unfolding position, and the backrest is further provided with a stopper for enclosing the lock fitting part and laterally shielding the self-locking member.

In an embodiment, the lock fitting part has a groove structure.

In an embodiment, the self-locking member is positioned in the backrest, the self-locking member is pushed by the side-impact protection block to be in a retracted state in which the elastic member is elastically deformed when the side impact protection block is positioned in the folding position, and the self-locking member is free from being pushed by the side impact protection block and slides to a position that blocks the side impact protection block in the unfolding position from switching to the folding position when the side impact protection block is positioned in the unfolding position.

In an embodiment, the backrest is provided with a metal sheet, the self-locking member inserts through the metal sheet, and the elastic member is provided between the self-locking member and the metal sheet.

In an embodiment, the metal sheet has a "Y" shape.

In an embodiment, the side impact protection block includes a side impact protection block body pivoted to the backrest and a blocking member slidable to a blocking position or an avoidance position on the side impact protection block body, the blocking member projects out of the side impact protection block body to be in a blocking position that blocks against the backrest in a pivotally folding direction when the side impact protection block switches to the unfolding position, meanwhile the self-locking member slides to a position that blocks the side impact protection block in the unfolding position from switching to the folding position under an action of the elastic member; the blocking member is retracted into the side impact protection block body to be in the avoidance position that is free from blocking against the backrest in the pivotally folding direction when the side impact protection block is in the folding position, and the self-locking member is pushed by the backrest to be in a retracted state in which the elastic member is elastically deformed.

In an embodiment, the self-locking member is fitted to the blocking member, and a telescopically slidable direction of the self-locking member intersects a sliding direction of the blocking member.

In an embodiment, the side impact protection block further includes a blocking reset member that has a constant tendency to drive the blocking member to slide to the blocking position.

In an embodiment, the blocking reset member is an elastic member provided between the blocking member and the side impact protection block body.

In an embodiment, an end of the blocking member positioned in front in an outwardly sliding direction has an inclined surface inclined with respect to the sliding direction of the blocking member, and the inclined surface of the blocking member is positioned in front of the blocking member in the pivotally unfolding direction of the side impact protection block.

In an embodiment, the blocking member is a blocking block that exposes from the backrest when the side impact protection block is positioned in the unfolding position.

In an embodiment, the self-locking member is a pin member or a block member.

To achieve the above object, the child safety seat of the present disclosure includes a seat part, a backrest fitted with the seat part, and the aforementioned side impact protection mechanism.

In an embodiment, the child safety seat of the present disclosure further includes a base for detachably fitting and connecting the seat part.

In contrast to the prior art, since the side impact protection mechanism of the present disclosure further includes a self-locking structure fitted to the side impact protection block or the backrest, the self-locking structure automatically moves to a position that blocks the side impact protection block in the unfolding position from switching to the folding position when the side impact protection block is switched from the folding position to the unfolding position, and the backrest and/or the side impact protection block shield the self-locking structure to block the release operation of the self-locking structure by the operator. Therefore, when the side impact protection block is in the unfolding position with respect to the backrest for the first time, the side impact protection block in the unfolding position is blocked from switching to the unfolding position by the self-locking structure, and the self-locking structure is blocked by the backrest and the side impact protection block, thereby blocking the release operation of the self-locking structure by the operator, so that the side impact protection block cannot be switched to the folding position after the first use, thereby effectively preventing the side impact protection block from being accidentally folded during the side impact to provide a side impact protection effect.

DETAILED DESCRIPTION OF THE EMBODIMENTS

Figure 1:
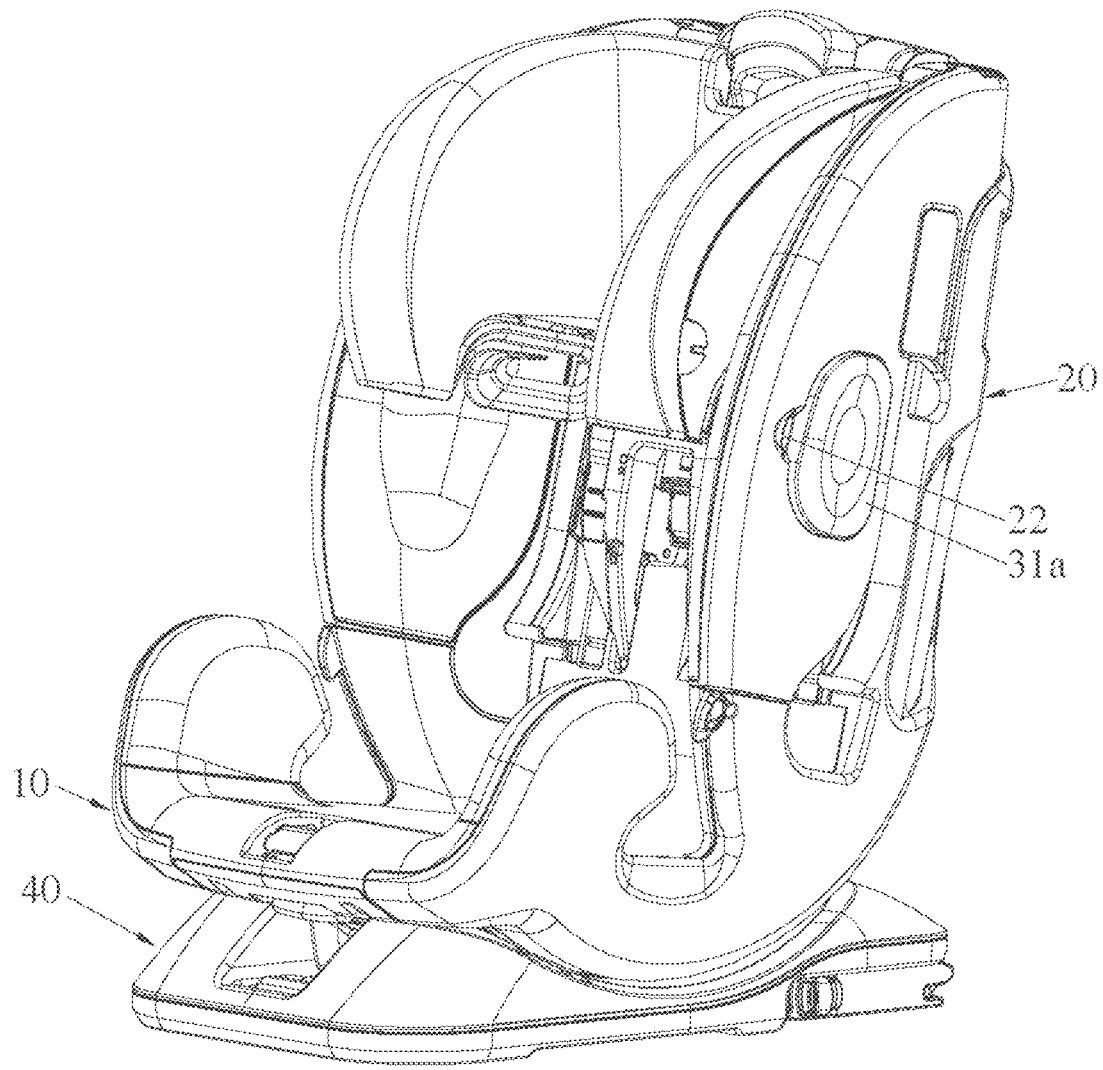
FIG. 1 is a schematic perspective view of a child safety seat according to a first embodiment of the present disclosure when a side impact protection block is in a folding position.

Embodiments of the present disclosure will now be described with reference to the accompanying drawings, in which like reference numerals represent like elements.

Figure 2:
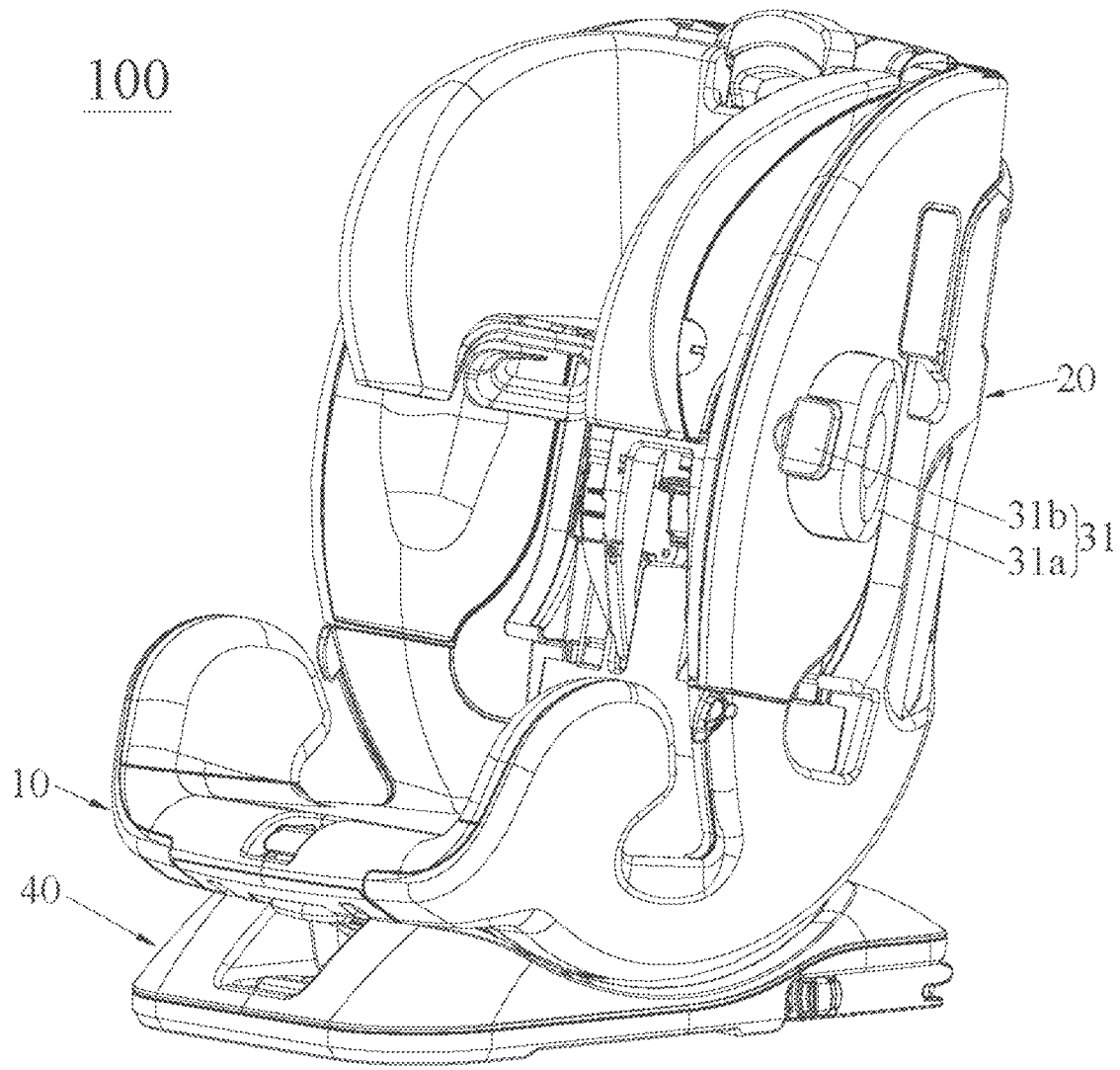
FIG. 2 is a schematic perspective view of the child safety seat according to the first embodiment of the present disclosure when the side impact protection block is in an unfolding position.

Referring to FIGS. 1 and 2, a child safety seat 100 according to a first embodiment of the present disclosure includes a seat part 10, a backrest 20 fitted and connected to the seat part 10, side impact protection mechanisms 30 provided on the backrest 20, and a base 40 detachably fitted and connected to the seat part 10. Specifically, the seat part 10 is fixedly fitted with the backrest 20 so that the seat part 10 cannot be removed from the backrest 20. Of course, the seat part 10 may also be removably fitted with the backrest 20 according to actual needs, but is not limited thereto. In addition, the side impact protection mechanisms 30 are respectively provided on the left and right sides of the backrest 20. That is, the left and right sides of the backrest 20 are both provided with the side impact protection mechanism 30, so that a side impact protection function can be provided on the left and right sides of the backrest 20, but is not limited thereto. It will be appreciated that the base 40 may be deleted depending on actual needs, but not limited thereto.

Figure 3:
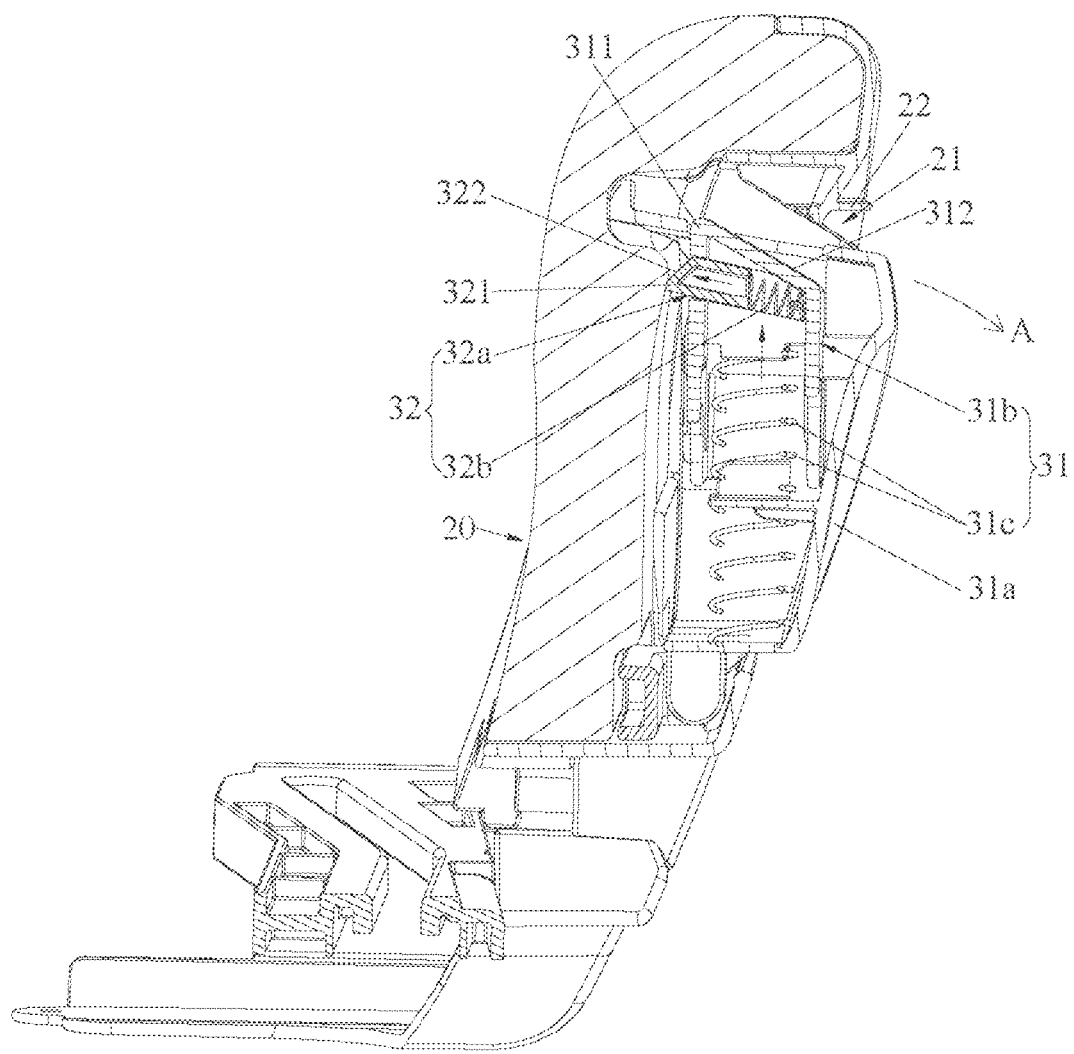
FIG. 3 is a schematic view showing an internal structure of the child safety seat in the state shown in FIG. 1 after the side impact protection mechanism is cut in a vertical plane.
Figure 4:
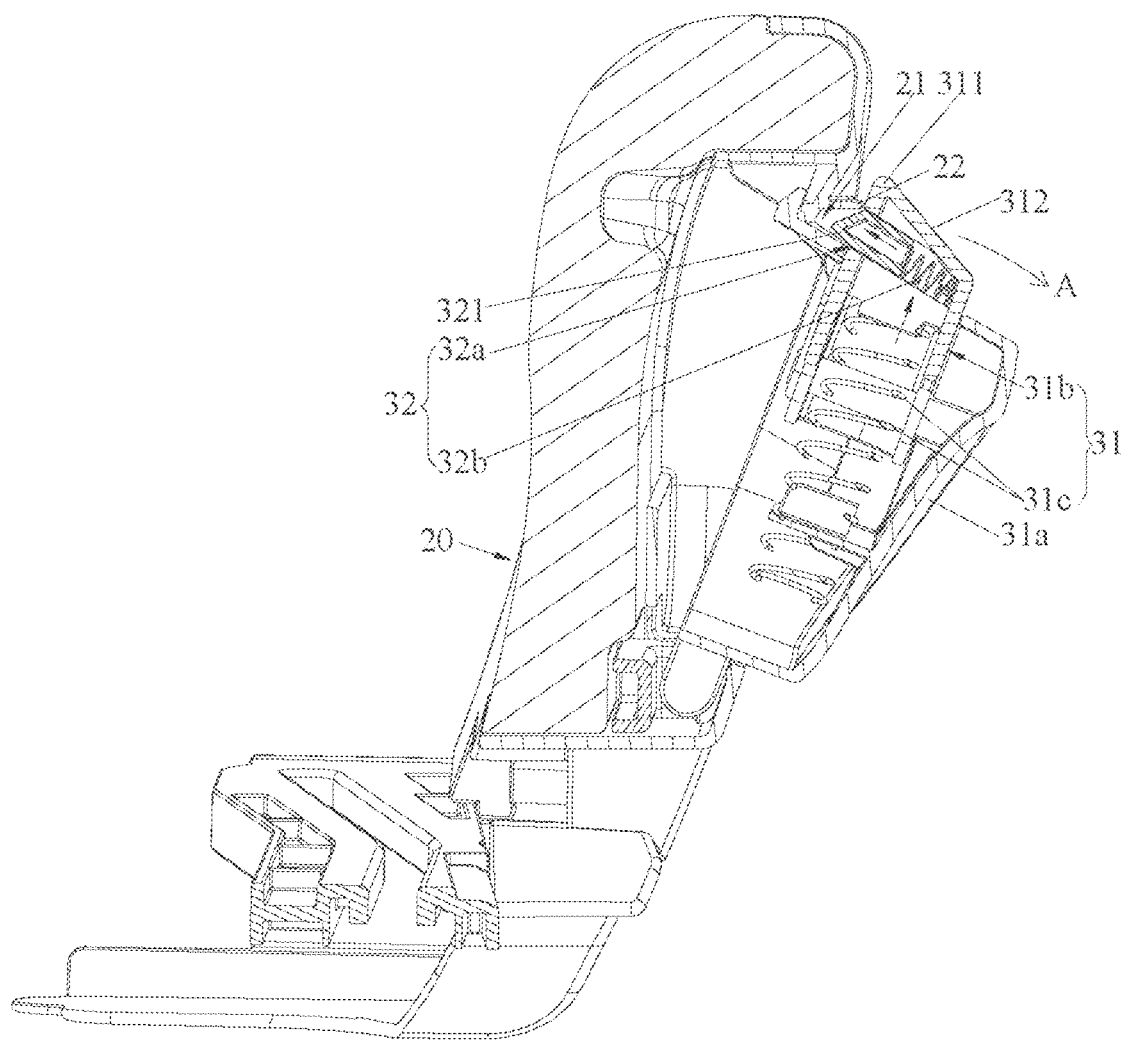
FIG. 4 is a schematic view showing an internal structure of the child safety seat in the state shown in FIG. 2 after the side impact protection mechanism is cut in a vertical plane.
Figure 5:
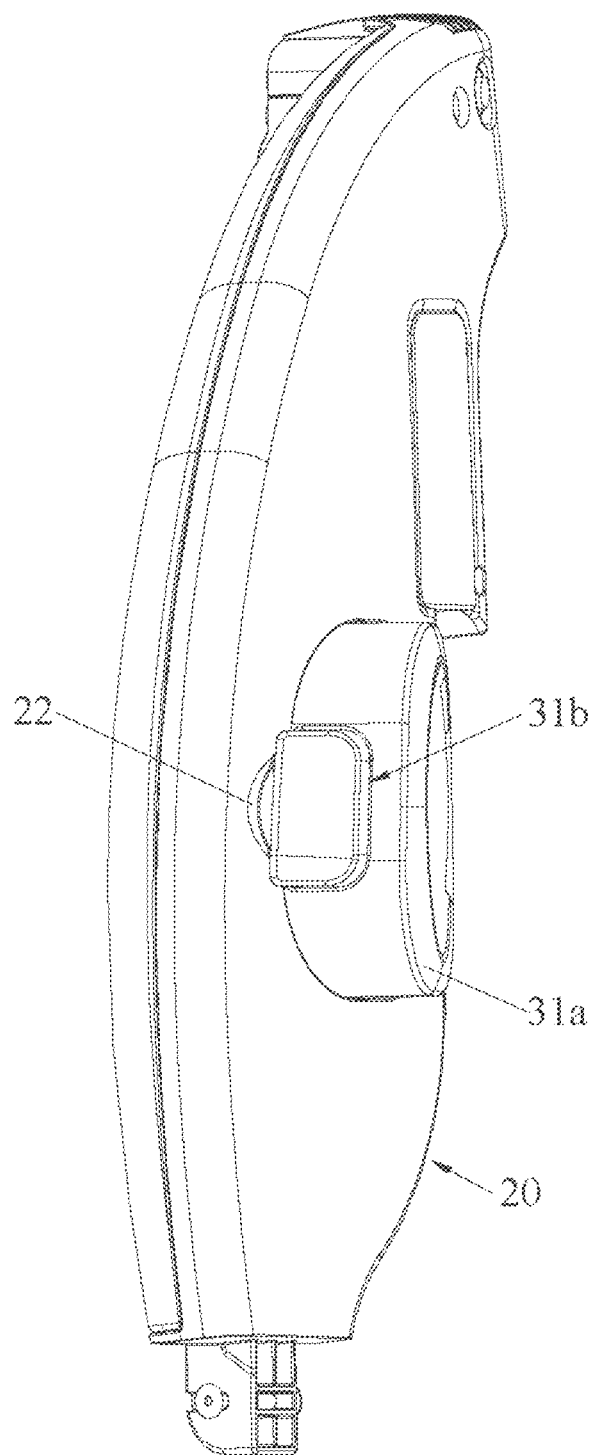
FIG. 5 is a schematic perspective view of the side impact protection mechanism in the child safety seat shown in FIG. 1 when the side impact protection mechanism is mounted on a portion of a backrest and the side impact protection block is in the unfolding position.

Referring to FIGS. 3 and 4, the side impact protection mechanism 30 includes a side impact protection block 31 and a self-locking structure 32. The side impact protection block 31 is movably mounted on the backrest 20, and in an embodiment, it is pivotally engaged with the backrest 20, so that the side impact protection block 31 is pivotally unfolded from or folded in the backrest 20. Of course, the side impact protection block 31 may be slidably mounted on the backrest 20 so that the side impact protection block 31 is slidably unfolded from or folded in the backrest 20 according to actual needs, but not limited thereto. The side impact protection block 31 has a folding position in which it can be folded inwardly in the backrest 20 (shown in FIGS. 1 and 3) and an unfolding position in which it can be unfolded outwardly from the backrest 20 (shown in FIGS. 2 and 4)). The self-locking structure 32 is fitted to the side impact protection block 31 such that the self-locking structure 32 and the side impact protection block 31 are fitted together. Of course, the self-locking structure may be fitted to the backrest according to actual needs, as will be described more specifically in the child safety seat of the second embodiment below. The self-locking structure 32 automatically moves to a position that blocks the side impact protection block 31 in the unfolding position from switching to the folding position when the side impact protection block 31 is switched from the folding position as shown in FIG. 3 to the unfolding position as shown in FIG. 4, the state of the self-locking structure 32 is shown in FIG. 4, so as to prevent the side impact protection block 31 in the unfolding position from being switched to the folding position and folded inward into the backrest 20. The backrest 20 and the side impact protection block 31 together shield the self-locking structure 32 to block a release operation of the self-locking structure 32 by the operator. That is, under a cover of both the backrest 20 and the side impact protection block 31, the operator cannot perform the release operation on the self-locking structure 32, so that the side impact protection block 31 cannot be switched to the folding position after being first used. More specifically, as follows:

As shown in FIGS. 3 and 4, the self-locking structure 32 includes a self-locking member 32a fitted to the side impact protection block 31 and being telescopically slidable and a self-locking reset member 32b providing a reset force for a telescopically slidable movement of the self-locking member 32a. The self-locking reset member 32b has a constant tendency to drive the self-locking member 32a to slide in an extending direction (i.e., a direction indicated by an arrow in the self-locking member 32a in FIGS. 3 and 4) to a position that blocks the side impact protection block 31 in the unfolding position from switching to the folding position. Specifically, the self-locking reset member 32b is an elastic member provided between the self-locking member 32a and the side impact protection block 31 in which the self-locking member 32a is located, such as, but not limited to, a compression spring, so as to simplify a fitting relationship between the self-locking reset member 32b and the self-locking member 32a and the side impact protection block 31, respectively. Of course, the self-locking reset member 32b may also be composed of two magnets which are mutually repulsed by magnetic forces, i.e., one mounted on the self-locking member 32a and the other mounted on the side impact protection block 31, depending on actual needs. In order to facilitate switching the self-locking member 32a from the folding position to the unfolding position smoothly in the side impact protection block 31, in FIG. 3, an end 321 of the self-locking member 32a positioned in front in the extending direction (i.e., the direction indicated by the arrow in the self-locking member 32a in FIG. 3) has an inclined surface 322 inclined with respect to the extending direction of the self-locking member 32a (i.e., the direction indicated by the arrow in the self-locking member 32a in FIG. 3). The inclined surface 322 of the self-locking member 32a is positioned in front of the self-locking member 32a in a pivotally unfolding direction of the side impact protection block 31 (see the direction indicated by the arrow A in FIG. 3). The self-locking member 32a is in a retracted state in which the elastic member is elastically deformed when the side impact protection block 31 is positioned in the folding position, as shown in FIG. 3. Specifically, since the self-locking member 32a is positioned on the side impact protection block 31, when the side impact protection block 31 is positioned in the folding position, the self-locking member 32a is pushed by the backrest 20 to be in a retracted state in which the elastic member is elastically deformed. In order that the self-locking member 32a on the side impact protection block 31 is adaptively locked with the backrest 20 when the side impact protection block 31 is in the unfolding position, so as to effectively block the side impact protection block 31 in the unfolding position from switching to the folding position, the backrest 20 is correspondingly provided with a lock fitting part 21 that is locked with the self-locking member 32a when the side impact protection block 31 is in the unfolding position. In an embodiment, the lock fitting part 21 has a groove structure, but is not limited thereto. The backrest 20 also has a stopper 22 for enclosing the lock fitting part 21 and laterally shielding the self-locking member 32a to shield the self-locking member 32a by the stopper 22, but is not limited thereto.

As shown in FIGS. 2 to 5, the side impact protection block 31 includes a side impact protection block body 31a pivoted to the backrest 20 and a blocking member 31b slidable to a blocking position shown in FIG. 4 or to an avoidance position shown in FIG. 3 on the side impact protection block body 31a. The blocking member 31b projects out of the side impact protection block body 31a during switching of the side impact protection block 31 to the unfolding position, so as to be in a blocking position blocking the backrest 20 in a pivotally folding direction (see an opposite direction indicated by the arrow A in FIG. 4). Meanwhile, the self-locking member 32a slides to a position that blocks the side impact protection block 31 in the unfolding position from switching to the folding position under an action of the elastic member, as shown in FIG. 4, so that the self-locking member 32a blocks the side impact protection block 31 in the unfolding position from switching to the folding position. The blocking member 31b is retracted into the side impact protection block body 31a when the side impact protection block 31 is in the folding position, and is in an avoidance position that is free from blocking the backrest 20 in the pivotally folding direction, and the self-locking member 32a is pushed by the backrest 20 and is in a retracted state in which the elastic member is elastically deformed, as shown in FIG. 3. Therefore, a double locking action against the side impact protection block body 32a can be realized by a cooperation of the blocking member 31b and the self-locking member 32a, and the side impact prevention effect is better. Specifically, the self-locking member 32a is fitted to the blocking member 31b, and a telescopically slidable direction of the self-locking member 32a (see the direction indicated by the arrow in the self-locking member 32a in FIGS. 3 and 4 and the opposite direction) intersects a sliding direction of the blocking member 31b (see the direction indicated by the arrow in the blocking member 31b in FIGS. 3 and 4 and the opposite direction), so as to more effectively block the side impact protection block 31 in the unfolding position from switching to the folding position. More specifically, the side impact protection block 31 further includes a blocking reset member 31c that has a constant tendency to drive the blocking member 31b to slide to the blocking position. For example, the blocking reset member 31c is an elastic member provided between the blocking member 31b and the side impact protection block body 31a, such as, but not limited to, a compression spring, so as to facilitate fitting between the blocking reset member 31c and the blocking member 31b and the side impact protection block body 31a, respectively, but is not limited thereto. Of course, the blocking reset member 31c may also be composed of two magnets which are mutually repulsed by magnetic force according to actual needs, i.e., one magnet is mounted on the blocking member 31b and the other magnet is mounted on the side impact protection block body 31a. It will be understood that when the side impact protection block 31 includes the side impact protection block body 31a, the blocking member 31b, and the self-locking reset member 31c, and the self-locking reset member 31c is composed of two magnets which are mutually repulsed by magnetic force, the magnets mounted on the side impact protection block 31 are positioned on the blocking member 31b and the side impact protection block body 31a respectively.

In order to facilitate switching the blocking member 31b from the folding position to the unfolding position smoothly in the side impact protection block 31, an end 311 of the blocking member 31b positioned in front in an outwardly extending direction (i.e., the direction indicated by the arrow in the blocking member 31b in FIGS. 3 and 4) has an inclined surface 312 inclined with respect to the sliding direction of the blocking member 31b (i.e., the direction indicated by the arrow in the blocking member 31b in FIGS. 3 and 4 and the opposite direction). The inclined surface 312 of the blocking member 31b is positioned in front of the blocking member 31b in a pivotally unfolding direction of the side impact protection block 31 (see the direction indicated by the arrow A in FIGS. 3 and 4). For example, the blocking member 31b is a blocking block that exposes from the backrest 20 when the side impact protection block 31 is in the unfolding position, and the self-locking member 32a is a block-shaped member, but is not limited thereto.

It will be understood that when the side impact protection block 31 is not designed to include the side impact protection block body 31a, the blocking member 31b, and the blocking reset member 31c, i.e., the side impact protection block 31 at this time is an integral structure, the self-locking member 32a provides a single locking blocking effect to the side impact protection block 31. When the side impact protection block 31 is designed to include the side impact protection block body 31a, the blocking member 31b, and the blocking reset member 31c, the blocking member 31b and the self-locking member 32a provides a double locking blocking effect to the side impact protection block body 31a.

With reference to FIGS. 1 to 5, an unfolding process of the side impact protection mechanism on the left side of the child safety seat according to the first embodiment of the present disclosure will be described. As shown in FIGS. 1 and 3, the side impact protection block 31 is in the folding position in which the side impact protection block 31 is inward folding into the backrest 20 when the side impact protection block 31 on the left side of the side impact protection mechanism 30 is not used for the first time, so that the self-locking member 32a is pushed by the backrest 20 to be in a retracted state in which the self-locking reset member 32b is elastically deformed (for example, but not limited to a compression deformation), and the blocking member 31b of the side impact protection block 31 is in the avoidance position so that the blocking reset member 31c is elastically deformed (for example, but not limited to the compression deformation thereof), as shown in FIG. 3. Next, in a process of pivotally unfolding the side impact protection block body 31a to the unfolding position in the direction indicated by the arrow A in FIG. 3, the blocking member 31b slides to the blocking position under an action of a reset force provided by the blocking reset member 31c, so that the blocking member 31b in the blocking position is blocked against the backrest 20 in the pivotally folding direction to block the side impact protection block body 31a in the unfolding position from switching to the folding position by the blocking member 31b. Meanwhile, in a process that the blocking member 31b slides to the blocking position under the action of the reset force provided by the blocking reset member 31c, the self-locking member 32a slides to a position that is locked with the lock fitting part 21 under the action of the reset force provided by the self-locking reset member 32b, so as to block the operator from pressing the blocking member 31b in the blocking position to be switched to the avoidance position, as shown in FIG. 4, so that the side impact protection block 31 can no longer be retracted into the backrest 20 after the first use.

Referring to FIGS. 6 to 10, a structure of a child safety seat according to a second embodiment of the present disclosure is basically the same as that of the child safety seat according to the first embodiment, except that the backrest and the side impact protection mechanism thereof are as follows:

(1) In the child safety seat 100' of the second embodiment, the self-locking member 32a' of the self-locking structure 32' in the side impact protection mechanism 30' is a pin member, while in the child safety seat 100 of the first embodiment, the self-locking member 32a of the self-locking structure 32 in the side impact protection mechanism 30 is a block-shaped member.

(2) In the child safety seat 100' of the second embodiment, the self-locking member 32a' is positioned in the backrest 20', and the self-locking structure 32' is shielded by the backrest 20'. Correspondingly, the self-locking member 32a' is pushed by the side impact protection block 31 to be in a retracted state in which the elastic member is elastically deformed when the side impact protection block 31 is positioned in the folding position, as shown in an enlarged part in FIG. 9, or an enlarged part at the top in FIG. 10. The self-locking member 32a' is free from being pushed by the side impact protection block 31 and slides to a position that blocks the side impact protection block 31 in the unfolding position from switching to the folding position when the side impact protection block 31 is in the unfolding position, as shown in the enlarged part of FIG. 8, or an enlarged part at the bottom in FIG. 10. In an embodiment, in the enlarged part at the top in FIG. 10, when the side impact protection block 31 is in the folding position, the self-locking member 32a' is pushed by an upper side wall 314 of the side impact protection block 31 to be in the retracted state in which the elastic member is elastically deformed. In the enlarged part at the bottom in FIG. 10, when the side impact protection block 31 is positioned in the unfolding position, the self-locking member 32a' is free from being pushed by the upper side wall 314 of the side impact protection block 31 and slides to a position that blocks the side impact protection block 31 in the unfolding position to the folding position. The self-locking member 32a' in this position is positioned rearward of an inner side wall 315 of the side impact protection block 31 in the pivotally unfolding direction and is blocked against the inner side wall 315, thereby blocking the side impact protection block 31 in the unfolding position from switching to the folding position. While in the child safety seat 100 of the first embodiment, the self-locking member 32a is positioned on the side impact protection block 31, specifically on the blocking member 31b of the side impact protection block 31. Therefore, when the side impact protection block 31 is positioned in the folding position, the self-locking member 32a is pushed by the backrest 20 and thus is in a retracted state that the elastic member is elastically deformed. When the side impact protection block 31 is in the unfolding position, the self-locking member 32a locks with the lock fitting part 21 provided in the backrest 20.

(3) In the child safety seat 100' of the second embodiment, since the self-locking member 32a' blocks against the inner side wall 315 of the side impact protection block 31 when the side impact protection block 31 is in the unfolding position, the self-locking member 32a' is not provided with the inclined surface 322 of the self-locking member 32a in the child safety seat 100 of the first embodiment, and the backrest 20' is not provided with the lock fitting part 21 and the stopper 22.

(4) In the child safety seat 100' of the second embodiment, the backrest 20' is provided with a metal sheet 50. The self-locking member 32a is inserted through the metal sheet 50, and the elastic member is provided between the self-locking member 32a and the metal sheet 50. For example, the metal sheet 50 has a "Y" shape, the self-locking members 32a' are respectively inserted into two branch ends 51 on the metal sheet 50, and the self-locking members 32a' on each branch end 52 correspond to a self-locking reset member 32b. While in the child safety seat 100 of the first embodiment, the backrest 20 is not provided with a metal sheet.

In addition to the differences described above, other parts are the same as the child safety seat 100 of the first embodiment, and will not be described herein again.

Figure 6:
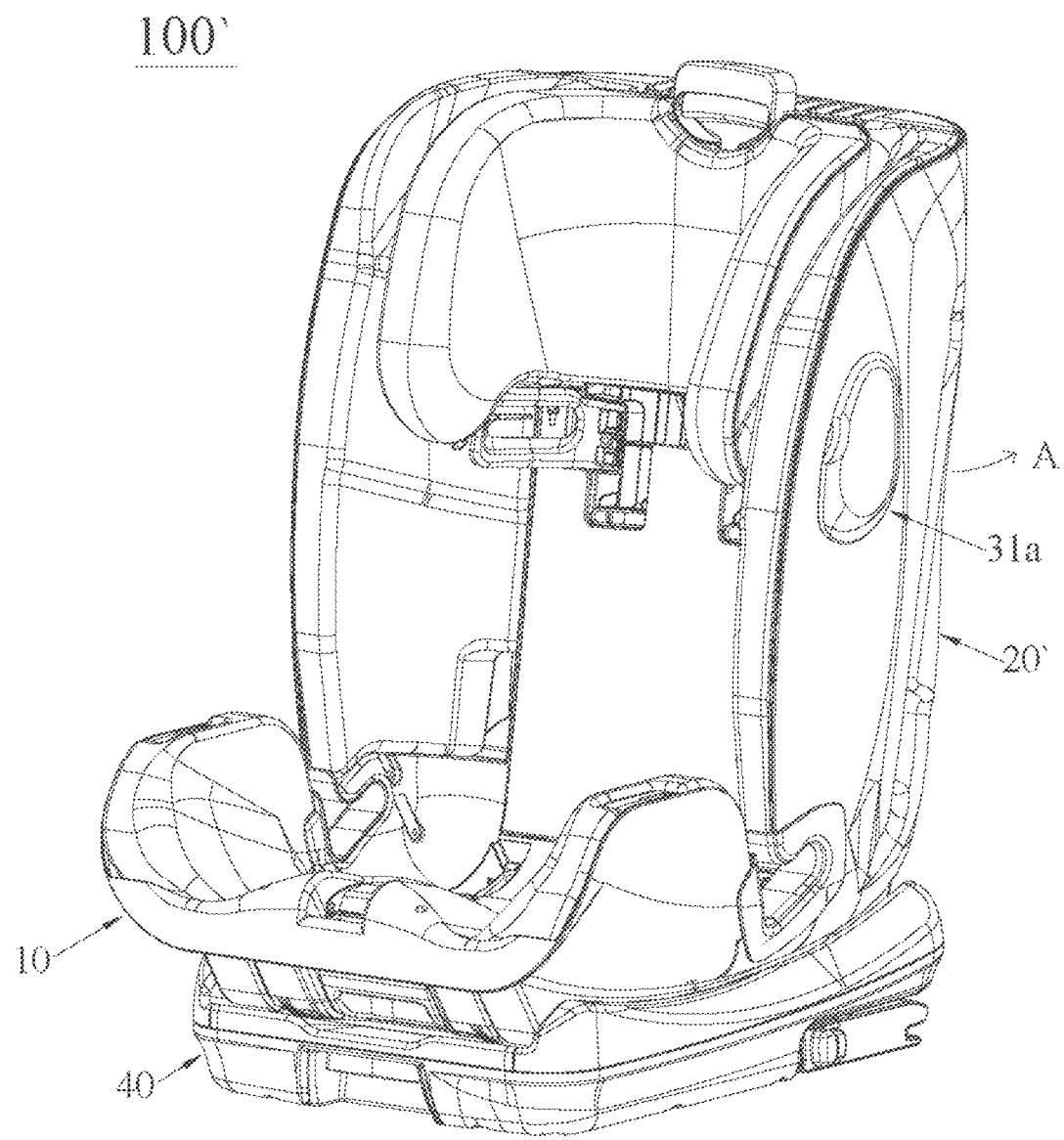
FIG. 6 is a schematic perspective view of a child safety seat according to a second embodiment of the present disclosure when a side impact protection block is in a folding position.
Figure 7:
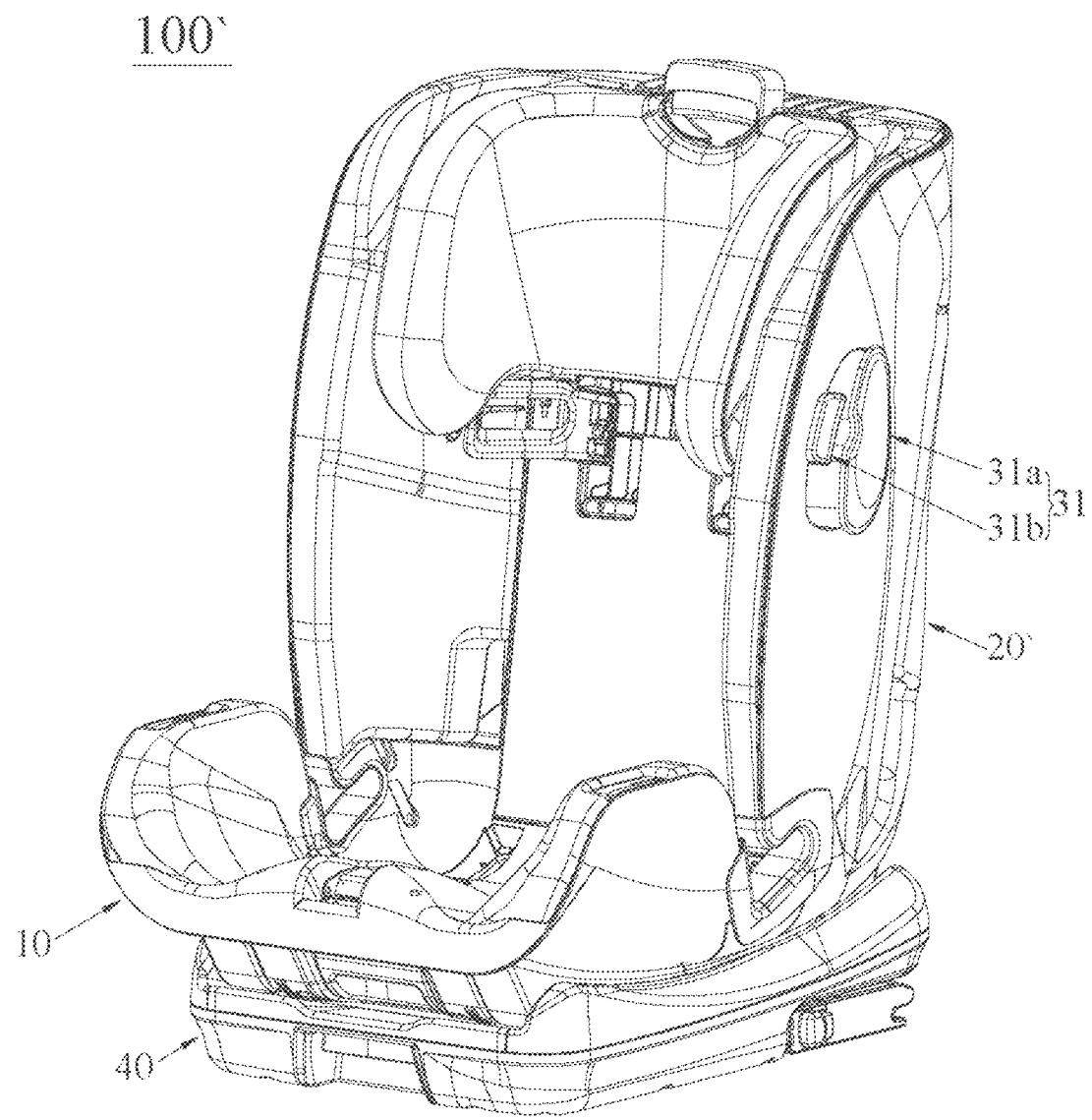
FIG. 7 is a schematic perspective view of the child safety seat according to the second embodiment of the present disclosure when the side impact protection block is in an unfolding position.
Figure 8:
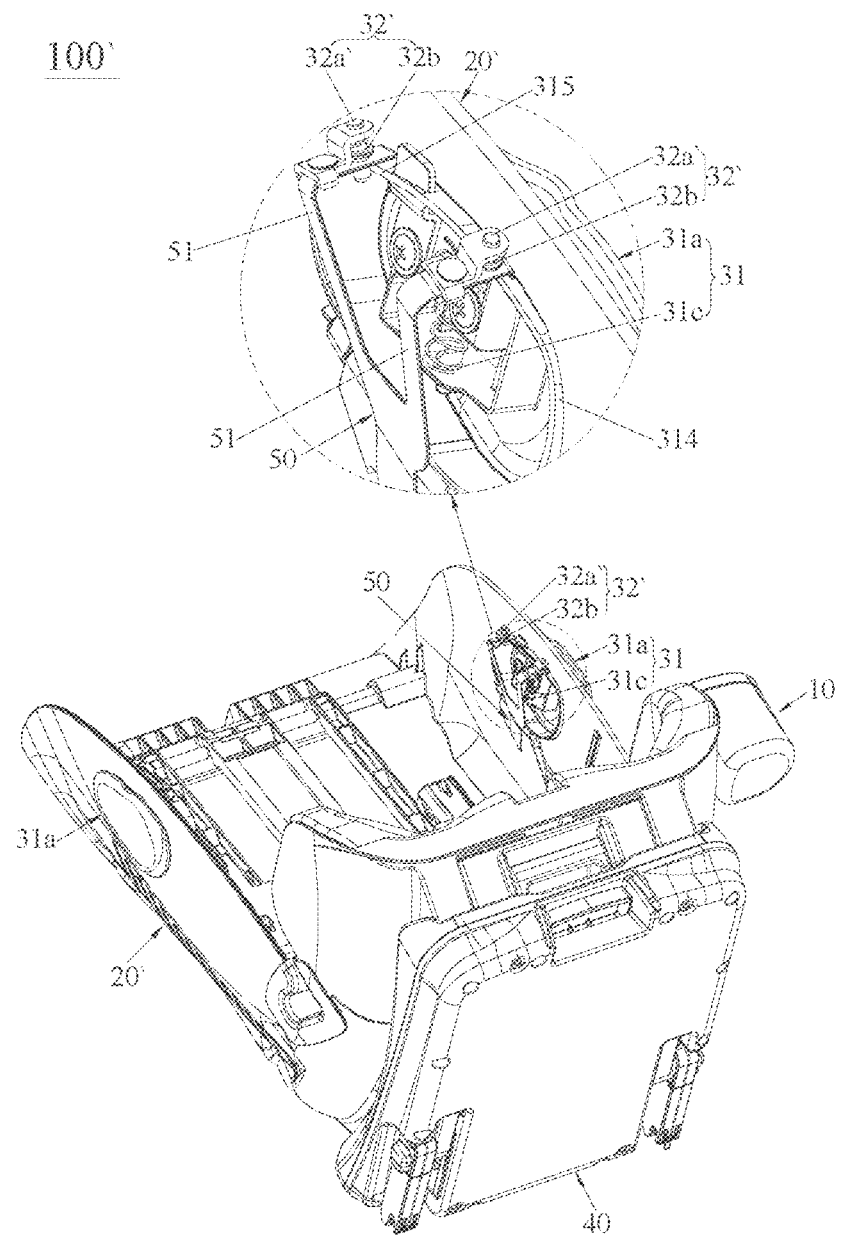
FIG. 8 is a schematic perspective view of the child safety seat in the state shown in FIG. 7 at another angle when a headrest is hidden, showing the side impact protection block on the left side in the unfolding position and the side impact protection block on the right side in the folding position.
Figure 9:
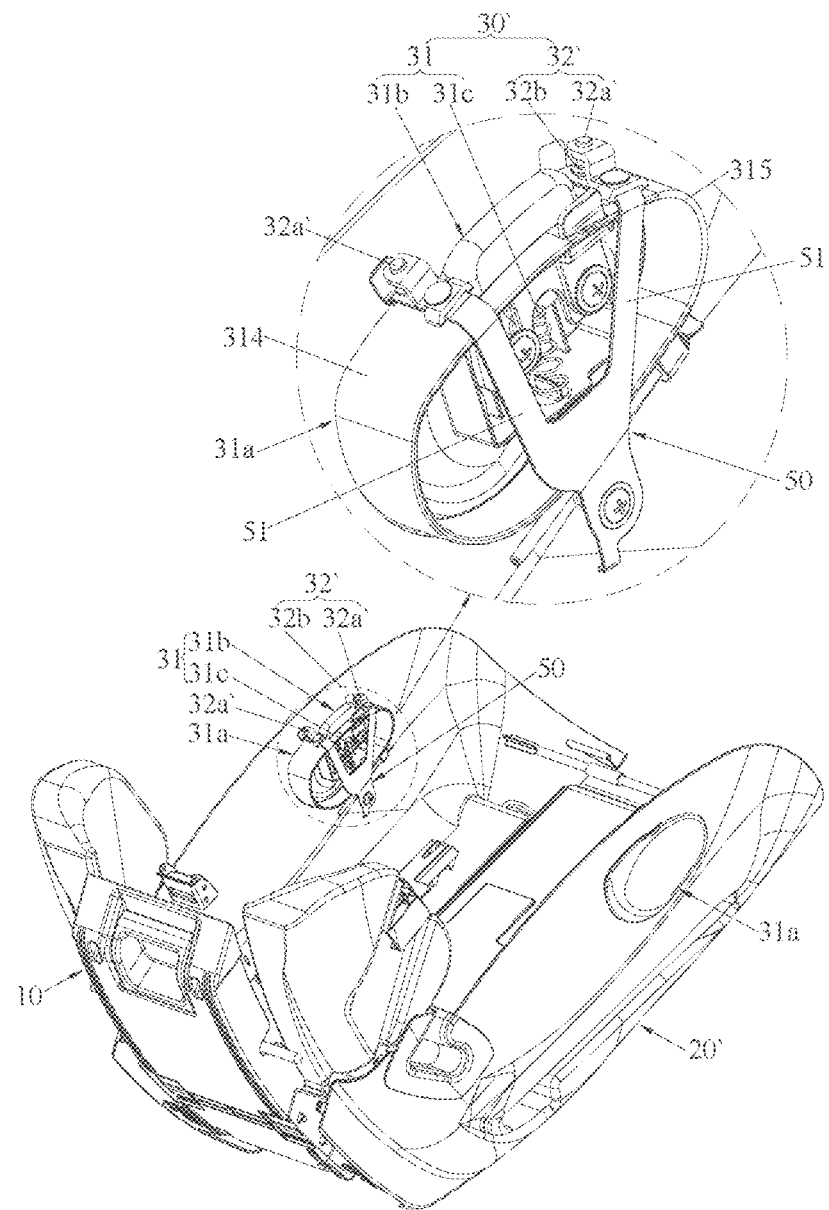
FIG. 9 is a schematic perspective view of the child safety seat in the state shown in FIG. 7 at a further angle when the headrest is hidden, showing the side impact protection block on the left side in the folding position and the side impact protection block on the right side in the unfolding position.
Figure 10:
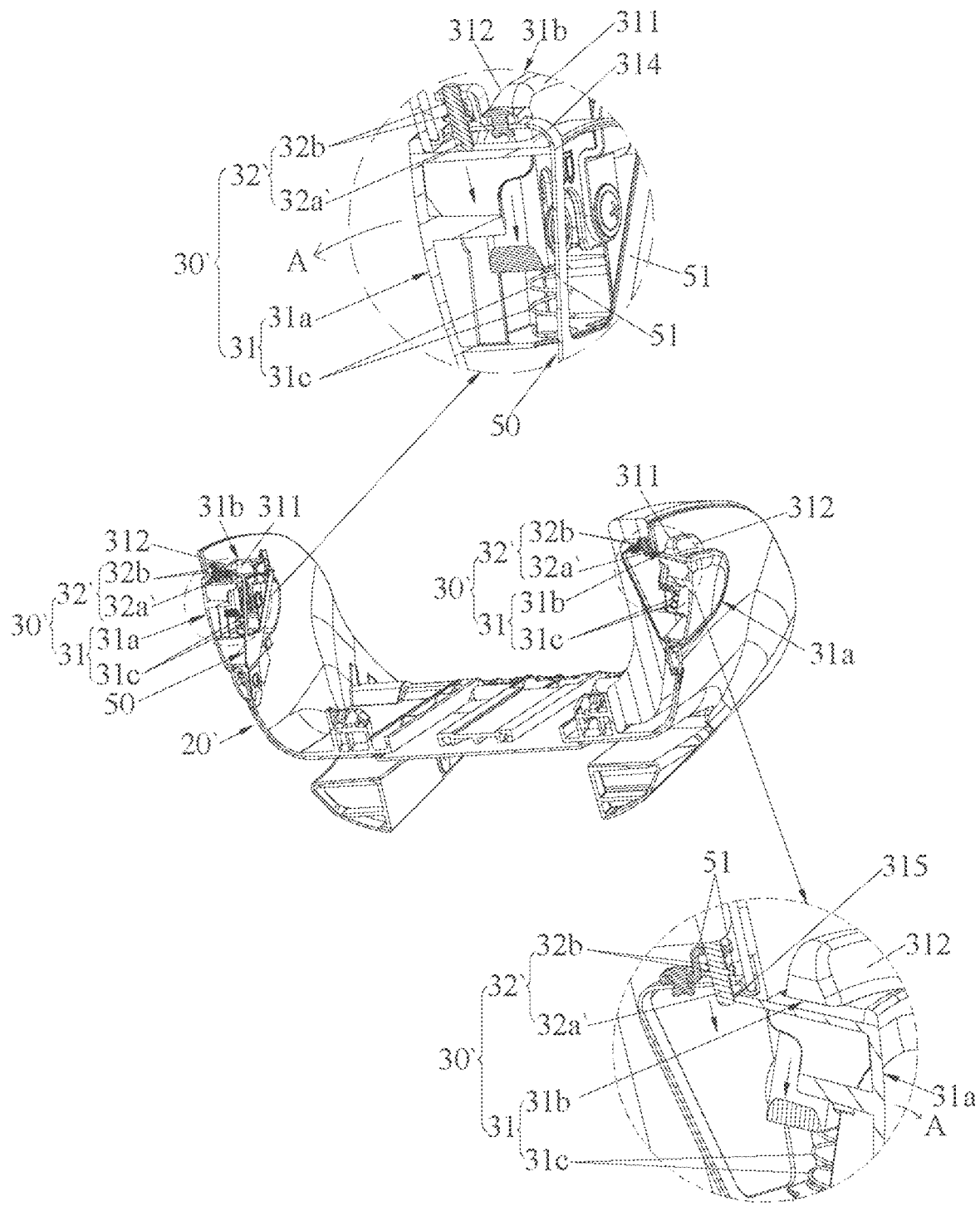
FIG. 10 is a schematic view of an internal structure of the child safety seat in FIG. 8 after being cut in a horizontal plane.

With reference to FIG. 6, FIG. 7, FIG. 8, and FIG. 10, an unfolding principle of the side impact protection mechanism on the left side of the child safety seat according to the second embodiment of the present disclosure will be described as follows:

As shown in FIG. 6, the side impact protection block 31 is in the folding position in which the side impact protection block 31 is inward folding into the backrest 20' when the side impact protection block 31 on the left side of the side impact protection mechanism 30' is not used for the first time, so that the self-locking member 32a is pushed by the side impact protection block body 31a (specifically, it is pushed by the upper side wall 314 of the side impact protection block body 31a) to be in a retracted state in which the self-locking reset member 32b is elastically deformed (for example, but not limited to a compression deformation), and the blocking member 31b of the side impact protection block 31 is in the avoidance position so that the blocking reset member 31c is elastically deformed (for example, but not limited to the compression deformation thereof). Next, in a process of pivotally unfolding the side impact protection block body 31a to the unfolding position in the direction indicated by the arrow A in FIG. 6, the blocking member 31b slides to the blocking position under an action of a reset force provided by the blocking reset member 31c, so that the blocking member 31b in the blocking position is blocked against the backrest 20 in the pivotally folding direction to block the side impact protection block body 31a in the unfolding position from switching to the folding position by the blocking member 31b. Meanwhile, when the side impact protection block 31a is switched to the unfold position, since the upper side wall 314 of the side impact protection block body 31a is free from pushing the self-locking member 32a', the self-locking member 32a' slides to the rear of the inner side wall 315 of the side impact protection block body 31a under the action of the reset force provided by the self-locking reset member 32b. Thus, the self-locking member 32a' is blocked against the inner side wall 315 in the pivotally folding direction. Although the operator can push the blocking member 31b in the blocking position to switch to the avoidance position, the self-locking member 32a' is blocked against the inner side wall 315 in the pivotally folding direction, thus the side impact protection block 31 cannot be retracted into the backrest 20 after the first use.

In contrast to the prior art, since the side impact protection mechanism 30 (30') of the present disclosure further includes a self-locking structure 32 (32') fitted to the side impact protection block 31 or the backrest 20 (20'), the self-locking structure (32') automatically moves to a position that blocks the side impact protection block 31 in the unfolding position from switching to the folding position when the side impact protection block (31) is switched from the folding position to the unfolding position, and the backrest 20 (20') and/or the side impact protection block 31 shield the self-locking structure 32 (32') to block the release operation of the self-locking structure (32') by the operator. Therefore, when the side impact protection block 31 is in the unfolding position with respect to the backrest for the first time, the side impact protection block 31 in the unfolding position is blocked from switching to the unfolding position by the self-locking structure 32 (32'), and the self-locking structure 32 (32') is blocked by the backrest 20 (20') and the side impact protection block 31, thereby blocking the release operation of the self-locking structure 32 (32') by the operator, so that the side impact protection block 31 cannot be switched to the folding position after the first use, thereby effectively preventing that the side impact protection block 31 does not provide a side impact protection effect due to being accidentally folded during the side impact.

It should be noted that the aforementioned left and right sides means an orientation when the user sits in the child safety seat 100 (100') of the present disclosure, and the user's back faces the backrest 20 (20'). In this case, an orientation of the user's left hand is the left side of the child safety seat 100 (100') and an orientation of the user's right hand is the right side of the child safety seat 100 (100').

The above disclosed are only the preferred embodiments of the present disclosure. Of course, the scope of rights of the present disclosure cannot be limited by this. Therefore, equivalent changes made according to the scope of the patent application of the present disclosure still fall within the scope of the present disclosure.

What is claimed is:

1. A side impact protection mechanism provided at a backrest of a child safety seat and comprising a side impact protection block movably fitted to the backrest and having a folding position in which the side impact protection block is inwardly folded in the backrest and an unfolding position in which the side impact protection block is outwardly unfolded from the backrest, wherein the side impact protection mechanism further comprises a self-locking structure fitted to the side impact protection block or the backrest, the self-locking structure automatically moves to a position where the self-locking structure blocks the side impact protection block in the unfolding position from switching to the folding position when the side impact protection block is switched from the folding position to the unfolding position, and the backrest and the side impact protection block shields the self-locking structure to block a release operation of the self-locking structure by an operator;
wherein the self-locking structure comprises a self-locking member fitted to the backrest or the side impact protection block and being telescopically slidable, and a self-locking reset member providing a reset force for a telescopically slidable movement of the self-locking member, the self-locking reset member has a constant tendency to drive the self-locking member to slide in an extending direction to a position that blocks the side impact protection block in the unfolding position from switching to the folding position;
wherein the side impact protection block comprises a side impact protection block body pivoted to the backrest and a blocking member slidable to a blocking position or an avoidance position on the side impact protection block body, the blocking member projects out of the side impact protection block body to be in a blocking position that blocks against the backrest in a folding direction when the side impact protection block switches to the unfolding position, meanwhile the self-locking member slides to a position that blocks the side impact protection block in the unfolding position from switching to the folding position under an action of the self-locking reset member, the blocking member is retracted into the side impact protection block body to be in the avoidance position that is free from blocking against the backrest in the folding direction when the side impact protection block is in the folding position, and the self-locking member is pushed by the backrest to be in a retracted state in which the self-locking reset member is elastically deformed.

2. The side impact protection mechanism of claim 1, wherein the self-locking reset member is an elastic member provided between the self-locking member and the side impact protection block or the backrest on which the self-locking member is located.

3. The side impact protection mechanism of claim 2, wherein the side impact protection block is pivoted to the backrest.

4. A side impact protection mechanism provided at a backrest of a child safety seat and comprising a side impact protection block movably fitted to the backrest and having a folding position in which the side impact protection block is inwardly folded in the backrest and an unfolding position in which the side impact protection block is outwardly unfolded from the backrest;
wherein the side impact protection mechanism further comprises a self-locking structure fitted to the side impact protection block or the backrest, the self-locking structure automatically moves to a position where the self-locking structure blocks the side impact protection block in the unfolding position from switching to the folding position when the side impact protection block is switched from the folding position to the unfolding position, and the backrest and the side impact protection block shields the self-locking structure to block a release operation of the self-locking structure by an operator;
wherein the self-locking structure comprises a self-locking member fitted to the backrest or the side impact protection block and being telescopically slidable, and a self-locking reset member providing a reset force for a telescopically slidable movement of the self-locking member, the self-locking reset member has a constant tendency to drive the self-locking member to slide in an extending direction to a position that blocks the side impact protection block in the unfolding position from switching to the folding position;
wherein the self-locking member is positioned in the backrest, the self-locking member is pushed by the side-impact protection block to be in a retracted state in which the self-locking reset member is elastically deformed when the side impact protection block is positioned in the folding position, and the self-locking member is free from being pushed by the side impact protection block and slides to a position that blocks the side impact protection block in the unfolding position from switching to the folding position when the side impact protection block is positioned in the unfolding position;
wherein the backrest is provided with a metal sheet, the self-locking member inserts through the metal sheet, and the self-locking reset member is provided between the self-locking member and the metal sheet.

5. The side impact protection mechanism of claim 1, wherein the self-locking member is fitted to the blocking member, and a telescopically slidable direction of the self-locking member intersects a sliding direction of the blocking member.

6. The side impact protection mechanism of claim 1, wherein the side impact protection block further comprises a blocking reset member that has a constant tendency to drive the blocking member to slide to the blocking position.

7. The side impact protection mechanism of claim 6, wherein the blocking reset member is an elastic member provided between the blocking member and the side impact protection block body.

8. The side impact protection mechanism of claim 1, wherein an end of the blocking member positioned in front in an outwardly sliding direction has an inclined surface inclined with respect to the sliding direction of the blocking member, and the inclined surface of the blocking member is positioned in front of the blocking member in the pivotally unfolding direction of the side impact protection block.

9. The side impact protection mechanism of claim 1, wherein the blocking member is a blocking block that exposes from the backrest when the side impact protection block is positioned in the unfolding position.

10. The side impact protection mechanism of claim 1, wherein the self-locking member is a pin member or a block member.

11. A side impact protection mechanism provided at a backrest of a child safety seat, the side impact protection mechanism comprising:
- a side impact protection block movably fitted to the backrest and having a folding position in which the side impact protection block is inwardly folded in the backrest and an unfolding position in which the side impact protection block is outwardly unfolded from the backrest;
- a self-locking structure fitted to the side impact protection block or the backrest;
- wherein the self-locking structure is configured to move to a position that blocks the side impact protection block in the unfolding position from switching to the folding position when the side impact protection block is switched from the folding position to the unfolding position;
- wherein the backrest and the side impact protection block shields the self-locking structure to block a release operation of the self-locking structure by an operator;
- wherein the self-locking structure comprises a self-locking member fitted to the backrest or the side impact protection block and being telescopically slidable, and a self-locking reset member providing a reset force for a telescopically slidable movement of the self-locking member, the self-locking reset member has a constant tendency to drive the self-locking member to slide in a extending direction to a position that blocks the side impact protection block in the unfolding position from switching to the folding position; and
- wherein an end of the self-locking member positioned in front in the extending direction has an inclined surface inclined with respect to the extending direction of the self-locking member, the inclined surface of the self-locking member is positioned in front of the self-locking member in a pivotally unfolding direction of the side impact protection block, and the self-locking member is in a retracted state in which the self-locking reset member is elastically deformed when the side impact protection block is positioned in the folding position.

12. The side impact protection mechanism of claim 11, wherein the self-locking member is located on the side impact protection block, and the self-locking member is pushed by the backrest to be in a retracted state in which the self-locking reset member is elastically deformed when the side impact protection block is positioned in the folding position.

13. The side impact protection mechanism of claim 11, wherein the backrest is correspondingly provided with a lock fitting part that is locked with the self-locking member when the side impact protection block is in the unfolding position, and the backrest is further provided with a stopper for enclosing the lock fitting part and laterally shielding the self-locking member.

14. The side impact protection mechanism of claim 13, wherein the lock fitting part has a groove structure.

15. The side impact protection mechanism of claim 4, wherein the metal sheet has a "Y" shape.

16. A child safety seat comprising a seat part and a backrest fitted with the seat part, wherein the child safety seat further comprises the side impact protection mechanism; the side impact protection comprises:
- a side impact protection block movably fitted to the backrest and having a folding position in which the side impact protection block is inwardly folded in the backrest and an unfolding position in which the side impact protection block is outwardly unfolded from the backrest; and
- a self-locking structure fitted to the side impact protection block or the backrest;
- wherein the self-locking structure is configured to move to a position that blocks the side impact protection block in the unfolding position from switching to the folding position when the side impact protection block is switched from the folding position to the unfolding position;
- wherein the backrest and the side impact protection block shields the self-locking structure to block a release operation of the self-locking structure by an operator;
- wherein the self-locking structure comprises a self-locking member fitted to the backrest or the side impact protection block and being telescopically slidable, and a self-locking reset member providing a reset force for a telescopically slidable movement of the self-locking member, the self-locking reset member has a constant tendency to drive the self-locking member to slide in a extending direction to a position that blocks the side impact protection block in the unfolding position from switching to the folding position;
- wherein the self-locking reset member is an elastic member provided between the self-locking member and the side impact protection block or the backrest on which the self-locking member is located; and
- wherein the backrest is provided with a metal sheet, the self-locking member inserts through the metal sheet, and the elastic member is provided between the self-locking member and the metal sheet.

17. The child safety seat of claim 16, further comprising a base for detachably fitting and connecting the seat part.

* * * * *